United States Patent [19]

Schöttker et al.

[11] Patent Number: 4,580,838
[45] Date of Patent: Apr. 8, 1986

[54] HINGE FITTINGS FOR ADJUSTABLE SEATS

[75] Inventors: Willi Schöttker, Nordsehl; Bernd Deptolla, Niedernwöhren, both of Fed. Rep. of Germany

[73] Assignee: P. A. Rentrop Hubert & Wagner Fahrzeugausstattungen GmbH & Co. KG, Stadthagen, Fed. Rep. of Germany

[21] Appl. No.: 613,528

[22] Filed: May 24, 1984

[30] Foreign Application Priority Data

May 28, 1983 [DE] Fed. Rep. of Germany ....... 3319397

[51] Int. Cl.$^4$ .............................................. B60N 1/02
[52] U.S. Cl. ...................................... 297/362; 74/375; 74/804; 74/805; 248/394; 297/329; 297/364
[58] Field of Search ............... 297/329, 362, 366, 364; 248/394-396; 74/803-805, 335, 373-375

[56] References Cited

U.S. PATENT DOCUMENTS

| 1,949,167 | 2/1934 | Magbach | 74/375 |
| 2,526,248 | 10/1950 | Luketa | 297/362 X |
| 2,655,199 | 10/1953 | Luketa | 297/362 X |
| 3,217,566 | 11/1965 | Sanson | 74/804 |
| 3,463,543 | 8/1969 | Zellar | 297/329 X |
| 3,955,445 | 5/1976 | Osterwalder | 74/805 |
| 4,065,983 | 1/1978 | Mimura | 74/335 X |
| 4,453,767 | 6/1984 | Walk et al. | 297/362 |
| 4,488,451 | 12/1984 | Ligensa et al. | 297/362 X |

FOREIGN PATENT DOCUMENTS

| 523567 | 4/1956 | Canada | 297/329 |
| 2138960 | 2/1972 | Fed. Rep. of Germany | 297/366 |

Primary Examiner—William E. Lyddane
Assistant Examiner—James R. Brittain
Attorney, Agent, or Firm—Penrose Lucas Albright

[57] ABSTRACT

A hinge fitting for an adjustable seat has a single rotatable handle by means of which the back rest can be tilted and the height of the seat portion adjusted. The handle is connected to a shaft which can be selectively coupled to one of two eccentrics mounted on an axle which passes through the two hinge parts and one end of a pivotable seat support. One eccentric is coupled to one hinge part which has spur gear areas engaging inner toothings on the other hinge part. Rotation of this eccentric causes the inclination of the back rest to be adjusted. The other eccentric is coupled to a portion of the end of the seat support which is constructed as a three-stage hollow piston having inner toothings engaging spur gear areas on the adjacent seat hinge part. Rotation of this eccentric causes the height of the seat to be adjusted.

9 Claims, 4 Drawing Figures

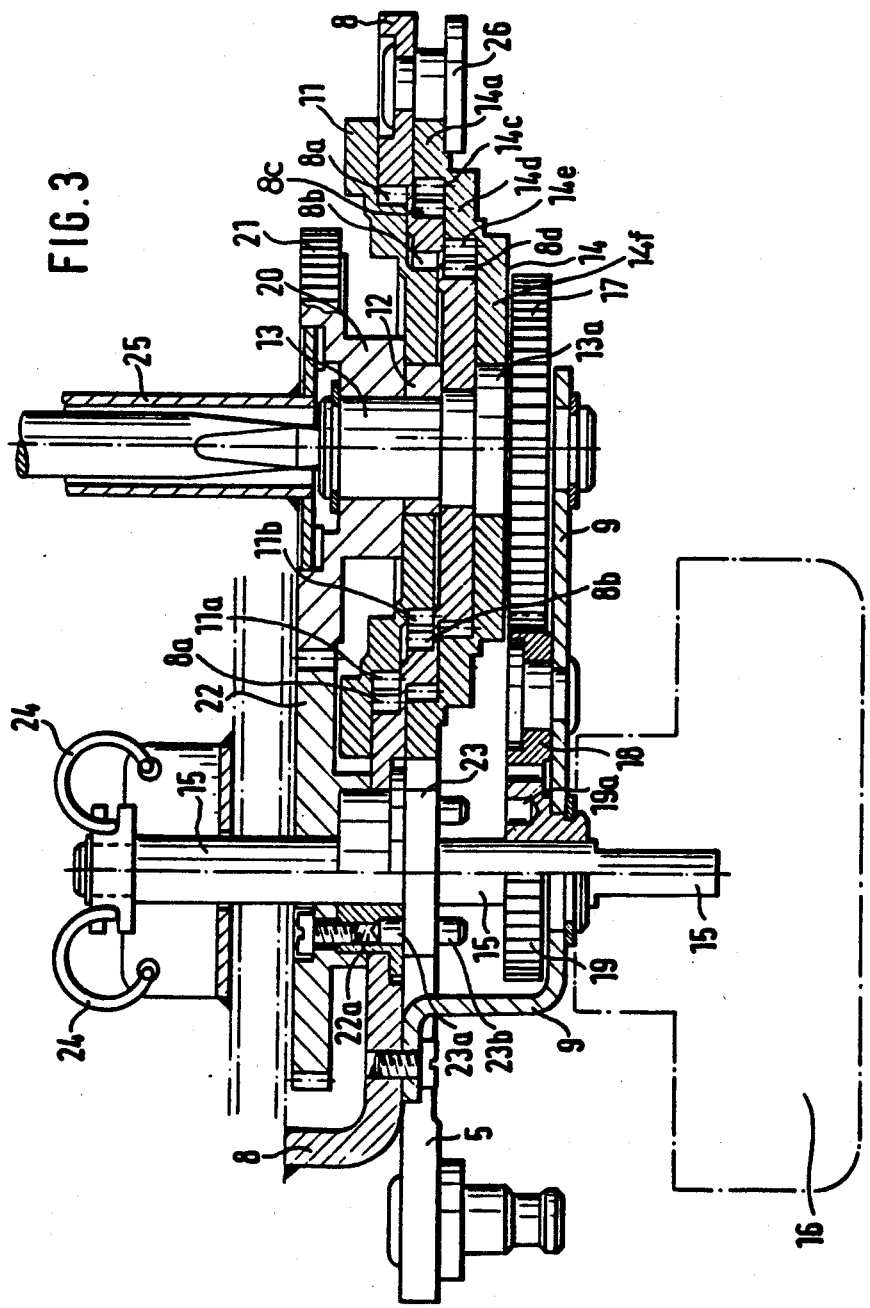

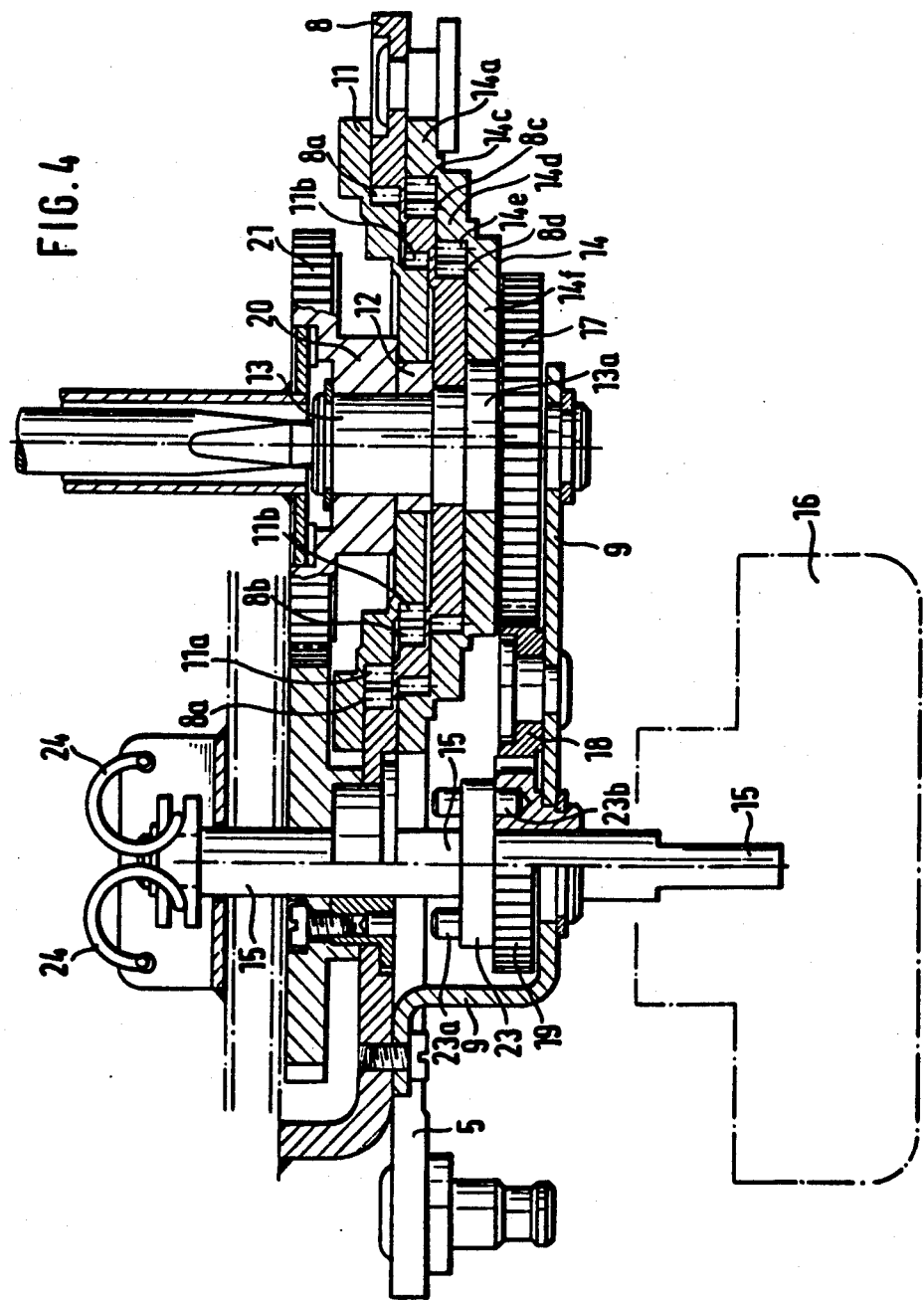

4,580,838

HINGE FITTINGS FOR ADJUSTABLE SEATS

BACKGROUND OF THE INVENTION

Technical Field

The present invention relates to a hinge fitting for seats with inclination-adjustable back rests and height-adjustable seat parts. The invention is particularly applicable to motor vehicle seats.

SUMMARY OF THE INVENTION

It is an object of the invention to provide a hinge fitting adapted so that, by the actuation of one and the same rotating handle, the seat back rest can be tilted, or the height of the seat can be adjusted, as desired.

The present invention provides a hinge fitting for a seat having an inclination-adjustable back rest and a height-adjustable seat part connected to the back rest by said hinge fitting, the seat part having a seat frame and a seat support connected to the seat frame by front and rear guides pivotally connected to said support and said frame at the front and rear of said seat part respectively, said hinge fitting including a first hinge part rigidly connected to said seat frame, a second hinge part connected to said back rest, an axle defining an axis connecting said hinge parts so that they are concentric and axially spaced on said axle, two axially spaced eccentrics disposed on said axle, one of said eccentrics engaging said second hinge part such that it is associated with said hinge parts, an adjustment mechanism including first and second inner toothings defined on said first hinge part, the second inner toothing being of smaller pitch diameter, first and second spur gear areas adapted to run respectively on said first and second inner toothings and defined on said second hinge part, first and second spur gear areas defined on said first hinge part, said first spur gear area of said first hinge part being concentric with said second inner toothing, said second spur gear area of said first hinge part being concentric with and axially displaced from said second inner toothing, and an end of said rear guide remote from said seat support defining a three stepped hollow hub through which said axle passes, said hub having a largest diameter portion, an intermediate diameter portion and a smallest diameter portion, the largest diameter portion having inner toothing on which said first spur gear area of said first hinge part runs, the intermediate diameter portion having inner toothing on which said second spur gear area of said first hinge part runs, the other of said eccentrics passing through said smallest diameter portion, such that said other eccentric is associated with said piston and said first hinge part, a shaft rotatable about an axis, a handle for said shaft, and means for coupling said shaft with one or other of said eccentrics so that the selected eccentric can be rotated by rotation of said shaft by said handle.

The invention also provides a hinge fitting for a seat having an inclination-adjustable back rest and a height-adjustable seat, including a first hinge part connected to said seat, a second hinge part connected to said back rest, an axle passing through said hinge parts, a seat support pivotally mounted to said seat by means of a part through which said axle passes, a rotatable shaft, two eccentrics mounted to said axle, one eccentric being associated with said second hinge parts, the other eccentric being associated with said seat support part, means coupling said hinge parts such that on rotation of said one eccentric the inclination of the back rest is adjusted, means coupling said seat support part and said first hinge part such that on rotation of said other eccentric the height of said seat is adjusted, and means for selectively coupling said rotatable shaft with one or other of said eccentrics.

BRIEF DESCRIPTION OF THE DRAWINGS

FIG. 3 is a section along line III—III in FIG. 2, the individual parts of the fitting being in their positions for adjusting the inclination of the back rest; and FIG. 4 is a section along line III—III in FIG. 2, the individual parts of the fitting being in their positions for adjusting the height of the seat part.

DESCRIPTION OF A PREFERRED EMBODIMENT

Figure 1:
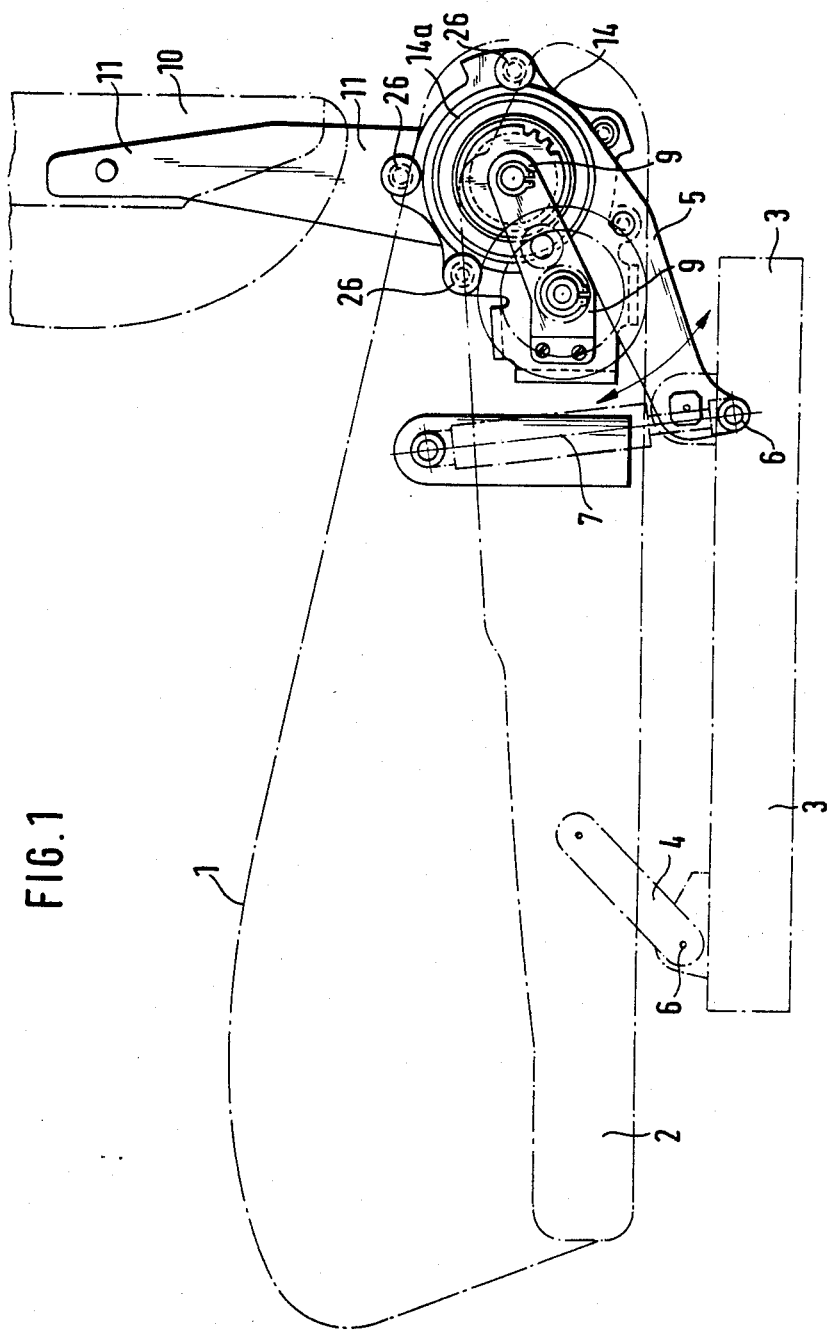
FIG. 1 is a partial side view of a motor vehicle seat with a hinge fitting according to the invention.
Figure 2:
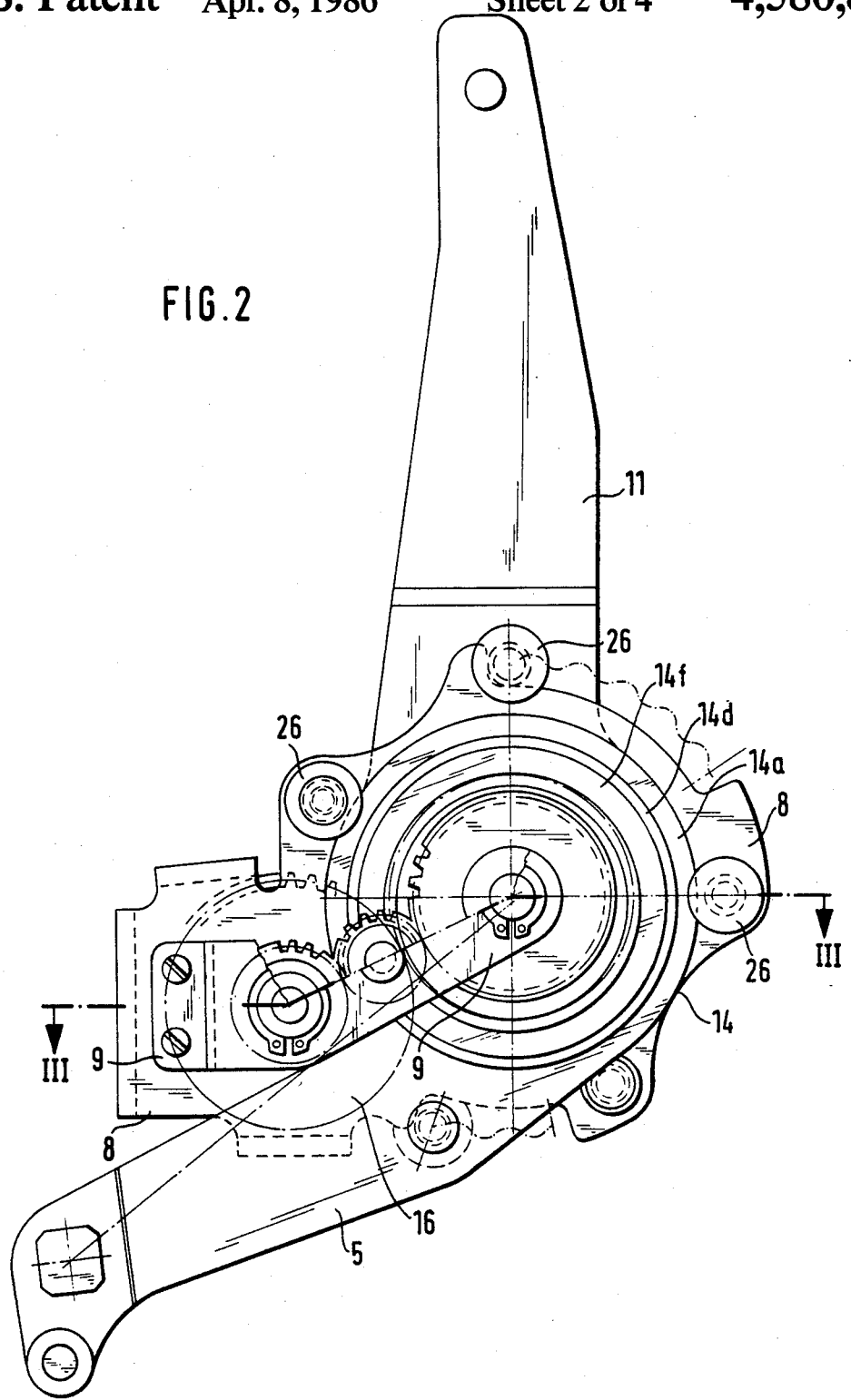
FIG. 2 is a side view on an enlarged scale of the hinge fitting of FIG. 1.

A seat part 1 has a sitting area mounted on a seat frame 2, under which there is a seat support 3 which is connected to the floor of a vehicle. The seat frame 2 is pivotally connected to the seat support 3 by means of a guide 4 disposed in its front area and of a guide 5 disposed in its rear area. The pivot or hinge connections between the guides and the seat support 3 are indicated at 6.

The sitting area 1 is supported when its height is being adjusted by one or more springs 7 which are hinged at each end on the sitting area 1 and the seat support 3 respectively. As springs, particularly pneumatic springs suitable for this application in seats are known per se, further details are not provided here.

A hinge part 8 is connected to the seat frame 2. A support 9 which extends substantially parallel is connected to the hinge parts. This hinge part will be referred to hereinafter as the "first hinge part". A hinge part 11 is rigidly connected with the seat back rest 10. This hinge part 11 will be referred to hereinafter as the "second hinge part". The two hinge parts 8 and 11 are joined together by means of a swivelling axle or spindle 13 which carries an eccentric 12.

An adjustment mechanism includes an inner toothing 8a on the first hinge part 8 and a first spur gear area 11a of the second hinge part 11 which engages and runs on the inner toothing 8a.

The adjustment mechanism also includes a second inner toothing 8b of smaller pitch diameter on the first hinge part. The second inner toothing 8b is disposed concentrically with the inner toothing 8a and is displaced in the axial direction relative to it. A second spur gear area 11b, on the second hinge part 11 engages and runs on the second inner toothing 8b. This spur gear area 11b is disposed concentrically with the first spur gear area 11a and is axially shifted relative to the spur gear area 11a.

The rear guide 5 situated towards the rear of the seat frame has one end which is remote from the seat support 3 constructed as a three-stage hollow hub 14 through which the swivelling axle 13 passes. The first portion 14a of the hollow hub 14 has the greatest diameter and has an inner toothing 14c on which a spur gear area 8c which forms another part of the adjustment mechanism runs. The spur gear area 8c lies on the first hinge part 8 concentrically with the second inner toothing 8b. The pitch diameter of the spur gear area 8c is greater than that of the second inner toothing 8b.

The second portion 14d of the hollow hub 14 has an intermediate diameter and bears an inner toothing 14e on which a second spur gear area 8d forming a further part of the adjustment mechanism runs. The spur gear area 8d is formed on the first hinge part 8 concentrically with the second inner toothing 8b of the first hinge part 8 and shifted in an axial direction relative to the second inner toothing.

Connected to the swivelling axle 13 is an eccentric 13a which passes through the portion 14f of smallest diameter of the hollow hub 14.

As shown in FIGS. 3 and 4, the first hinge part 8 also defines a three-stage hollow hub in the area of the swivelling axle 13.

A rotatable shaft 15 is axially movably and rotatably mounted in the support 9 and in the seat frame 2. One end of the shaft 15 is connected with a rotating handle 16.

The crown circles of the spur gear areas 11a, 11b, 8c and 8d are at least one tooth height smaller than the dedendum circles of the associated inner toothings 8a, 8b, 14c and 14e, the eccentricity of the two eccentrics 12 and 13a corresponds substantially to the difference between the dedendum circle of the inner toothing and the crown circle of the associated spur gear area in such a manner that automatic restraint between an inner toothing and the associated spur gear area is ensured.

The pitch diameter of the spur gear area 8c is greater than that of the second inner toothing 8b.

The eccentric 13a passes through the smallest diameter portion 14f of the hollow piston 14 and is connected to a toothed wheel 17 with which a pinion 18, fixedly yet rotatably mounted in the support 9, engages. This pinion 18 also engages with a gear wheel 19 mounted on the rotatable shaft 15.

The other eccentric 12 is swaged on a hollow cylindrical part 20 which is provided with an integral toothed rim 21. This rim 21 engages with a gear wheel 22 disposed on the rotatable shaft 15. Both gear wheels 19 and 22 are only loosely slid on the rotatable shaft 15.

A coupling member 23 is rigidly connected with the rotatable shaft 15, which is adapted to be axially movable between two engagement positions. In the respective engagement position the coupling member 23 connects the rotatable shaft with one or the other of the gear wheel 19 or 22. The coupling member 23 is a circular plate with bolts 23a, 23b disposed on both sides of its two circular closure surfaces. These bolts, in dependence on the selected engagement position of the rotatable shaft 15, engage positively either into corresponding recesses 19a or 22a of the two gear wheels 19 and 22 respectively.

The rotatable shaft 15 is mounted so as to be movable in the axial direction and is subject to the biasing action of springs 24 which counteract the thrust action of the rotatable shaft 15 and tend to bias the shaft 15 into the position shown in FIG. 3.

The toothed rim 21 is coupled by means of a tube 25 with a corresponding toothed rim on the fitting provided at the other side of the seat, as a result of which a kinematic connection is ensured between these two hinge fittings. The eccentrics 12 or 13a are in connection by means of a tube with the corresponding eccentrics of the opposite hinge fitting.

Bolts 26 hold the hinge parts 8 and 11 together without preventing their relative rotation. As a result of the mounting of the swivelling axle 13 in the support 9, an axial movement of the axle is prevented.

FIG. 3 of the drawing shows the individual parts of the hinge fitting in a position in which an adjustment of the seat back rest 10 can be made. In this position the coupling member 23 connects the rotatable shaft 15 with the gear wheel 22. Therefore rotary motion of the rotatable shaft 15 is transmitted to the toothed rim 21 and thus to the eccentric 12 which is loosely mounted on the swivelling axle 13. The consequence of the rotary motion of the eccentric 12 is a swivelling movement of the hinge part 11, firmly connected with the seat back 10, in the desired direction.

If the rotatable shaft 15 is moved forwardly by handle 16 against the force of the spring 24, into a position as shown in FIG. 4 of the drawing, then the coupling member 23 effects a connection of the rotatable shaft 15 with the gear wheel 19. Therefore when the rotatable shaft 15 is rotated its rotary motion is transmitted by means of the pinion 18 to the toothed wheel 17 with which the eccentric 13a of the swivelling axle 13 is rigidly connected. Therefore the hollow hub 14 of the guide 5 performs a wobbling movement. As the guide 5 is swivellably connected at point 6 with the seat support 3, the wobbling action of the hollow hub 14 causes the sitting area 1 to be raised or lowered in dependence on the sense of rotation of the rotatable shaft 15.

We claim:

1. A hinge fitting for a seat having an inclination-adjustable back rest and a height-adjustable seat part connected to the back rest by said hinge fitting, the seat part having a seat frame and a seat support connected to the seat frame by front and rear guides pivotally connected to said support and said frame at the front and rear of said seat part respectively, said hinge fitting including a first hinge part rigidly connected to said seat frame,
a second hinge part connected to said back rest,
an axle, defining an axis, and connecting said hinge parts so that they are concentric and axially spaced on said axle,
two axially spaced eccentrics disposed on said axle, a first one of said eccentrics engaging said second hinge part such that it is operatively connected with said hinge part,
an adjustment mechanism including
first and second inner toothings defined on said first hinge part, the second inner toothing being of smaller pitch diameter,
first and second spur gear areas operatively engaged respectively on said first and second inner toothings and defined on said second hinge part,
first and second spur gear areas defined on said first hinge part, said first spur gear area of said first hinge part being concentric with said second inner toothing, said second spur gear area of said first hinge part being concentric with and axially displaced from said second inner toothing, and
an end of said rear guide remote from said seat support defining a three stepped hollow hub through which said axle passes, said hub having a largest diameter portion, an intermediate diameter portion and a smallest diameter portion, the largest diameter portion having inner toothing on which said first spur gear area of said first hinge part runs, the intermediate diameter portion having inner toothing on which said second spur gear area of said first hinge part runs, the second of said eccentrics being coupled to said smallest diameter portion, such that said second eccentric is operatively connected with said hub and said first hinge part, a shaft rotatable about an axis, a handle for said shaft, and means for selectively coupling said shaft with one of said first and second said eccentrics so that the selected eccentric can be rotated by rotation of said shaft by said handle.

2. A hinge fitting according to claim 1, in which the crown circles of the spur gear areas are at least one tooth height smaller than the dedendum circles of the associated inner toothings, and in which the eccentricity of the two eccentrics corresponds substantially to the difference between the dedendum circle of the inner toothing and the crown circle of the associated spur gear area with which the eccentric is associated in such a manner that the automatic restraint between that inner toothing and the associated spur gear area is ensured.

3. A hinge fitting according to claim 1, in which the pitch diameter of the first spur gear area of the first hinge part is greater than that of the second inner toothing of the first hinge part.

4. A hinge fitting according to claim 1, in which said coupling means includes a first toothed wheel connected to said second eccentric, a rotatably mounted pinion engaging said toothed wheel, and a toothed wheel disposed on the rotatable shaft and in engagement with said pinion.

5. A hinge fitting according to claim 4, in which said coupling means further includes a hollow cylinder swaged to said first eccentric, a toothed rim on said hollow cylinder, and a second toothed wheel disposed on said rotatable shaft and in engagement with said rim.

6. A hinge fitting according to claim 5, in which said coupling means includes a coupling member rigidly coupled to said rotatable shaft, means for selectively coupling said coupling member with one of said first and second toothed wheels such that rotation of said shaft rotates the coupled toothed wheel.

7. A hinge fitting according to claim 6, in which said coupling member is a circular plate with bolts disposed on both sides thereof, said toothed wheels each including corresponding recesses for positively engaging the bolts.

8. A hinge fitting according to claim 1, in which said rotatable shaft is mounted in said seat frame, said fitting further including a support connected with said first hinge part, in which support said rotatable shaft is movably mounted, and spring means operatively connecting said rotatable shaft, to the seat frame and which acts in opposition to the thrust movement of the rotatable shaft.

9. A hinge fitting for a seat having an inclination-adjustable back rest and a height-adjustable seat, including a first hinge part connected to said seat, a second hinge part connected to said back rest, an axle extending through said hinge parts, a seat support pivotally mounted to said seat by means of a hub connected to the first hinge part through which hub said axle extends, a rotatable shaft, first and second eccentrics mounted to said axle, said first eccentric being operatively connected with said hinge part, said second eccentric being operatively connected with said seat support part, means coupling said hinge parts such that on rotation of said first eccentric the inclination of the back rest is adjusted, means coupling said seat support part and said first hinge part such that on rotation of said second eccentric the height of said seat is adjusted, and means for selectively coupling said rotatable shaft with one of said first and second eccentrics.

* * * * *